United States Patent
Klassen

(10) Patent No.: US 8,520,226 B2
(45) Date of Patent: Aug. 27, 2013

(54) ROBUST RECOVERY OF A PAGE PARALLEL RIP SYSTEM

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 625 days.

(21) Appl. No.: 12/760,881

(22) Filed: Apr. 15, 2010

(65) Prior Publication Data

US 2011/0255124 A1    Oct. 20, 2011

(51) Int. Cl.
*G06F 3/12*       (2006.01)
*G06K 15/00*     (2006.01)
*G06F 9/46*       (2006.01)

(52) U.S. Cl.
USPC ....... 358/1.13; 358/1.15; 358/1.18; 358/1.14; 358/1.17; 358/1.16; 718/1; 718/100; 718/104; 718/106; 382/302; 382/303; 382/304; 382/305; 382/307

(58) Field of Classification Search
USPC ........... 358/1.1, 1.11–1.18, 401, 2.1; 710/72; 715/234, 251
See application file for complete search history.

(56) References Cited

U.S. PATENT DOCUMENTS

| | | | |
|---|---|---|---|
| 6,817,791 B2 | 11/2004 | Klassen | |
| 7,161,705 B2 | 1/2007 | Klassen | |
| 8,264,726 B2 * | 9/2012 | Klassen et al. | 358/1.16 |
| 2004/0184061 A1 * | 9/2004 | Christiansen | 358/1.13 |
| 2004/0196470 A1 * | 10/2004 | Christiansen | 358/1.1 |
| 2004/0196496 A1 | 10/2004 | Klassen | |
| 2004/0196497 A1 | 10/2004 | Klassen et al. | |
| 2009/0161163 A1 * | 6/2009 | Klassen et al. | 358/1.18 |
| 2009/0225369 A1 | 9/2009 | Gordon et al. | |

OTHER PUBLICATIONS

U.S. Appl. No. 12/467,369, filed May 18, 2009, Klassen.
U.S. Appl. No. 12/624,761, filed Nov. 24, 2009, Klassen.
U.S. Appl. No. 12/703,261, filed Feb. 10, 2010, Klassen.

* cited by examiner

*Primary Examiner* — Chad Dickerson
(74) *Attorney, Agent, or Firm* — Philip E. Blair; Fleit Gibbons Gutman Bongini & Bianco P.L.

(57) ABSTRACT

What is disclosed is a novel fault tolerant page parallel RIP system having a plurality of distributed RIP nodes and a method for robust recovery in the event of a fault having occurred on the system. In one embodiment, the present fault tolerant page parallel RIP system comprises at least a plurality of RIP nodes, a supervisor node, and a splitter node. The splitter receives a location of the job file and splits the job file into at least one original chunk. In formation sufficient to regenerate the original chunk in the event of a fault condition having occurred on the page parallel RIP system is stored. The splitter then sends the original chunk to a destination RIP node wherein the original chunk is RIP'ed into at least one page in print-ready form. The one page is the provided in print-ready form to an output subsystem. Various embodiments are disclosed.

8 Claims, 7 Drawing Sheets

ROBUST RECOVERY OF A PAGE PARALLEL RIP SYSTEM

TECHNICAL FIELD

The present invention is directed to systems and methods which effectuate a robust recovery of a page parallel raster image processing (RIP) system having a plurality of nodes arrayed in a distributed environment such that the RIP system becomes more fault tolerant.

BACKGROUND

Generating print-ready documents to be printed by a printing system involves acquiring the information (content, graphics, production specs, etc.) required to view, process and output the desired document in an electronic form understandable by a print engine. Such systems can range from those that are simple and modestly expensive such as are well known to consumer users of personal computer systems, up to commercial printing systems that are capable of generating in the range of hundreds of pages per minute in full color. Most systems tend to have a high-level objective of printing faster. Generally, a print system receives a "job" to be printed. Each job is formatted in the system in a Page Description Language (PDL) such as PostScript, PDF, ASCII, PCL etc. Job parallelism increases the flexibility of the printing system.

In a Page Parallel RIP (PPR), jobs are consumed by a 'splitter' which identifies independently processable chunks of a given print job and distributes the identified chucks to individual RIP nodes, in a distributed environment, which process the chunks in parallel. Existing page parallel RIP systems may be Symmetric Multi-Processor (SMP), i.e., based on communication over a single bus, or distributed, based upon communication over an Ethernet, for example. When a RIP node crashes or otherwise goes offline, the entire PPR system faults. System recovery would be the same as for a serial system, i.e., the entire system brought back online and the print job restarted at the last printed page (or, in some cases, at the start of the last job). This may be acceptable in some print/copy job environments. However, as more and more devices move to a distributed environment comprising many RIP nodes such that a given job can be processed much faster in parallel, it is more and more desirable that PPR systems be fault tolerant and have robust recovery mechanisms.

Accordingly, what is needed in this art is a system and method for robust recovery of a page parallel RIP system having a plurality of distributed RIP nodes such that the RIP system becomes fault tolerant.

INCORPORATED REFERENCES

The following U.S. patents, U.S. patent applications, and Publications are incorporated herein in their entirety by reference.

"Idiom Recognizing Document Splitter", U.S. Pat. No. 6,817,791, to Klassen.

"Parallel Printing System Having Modes For Auto-Recovery, Auto-Discovery Of Resources, And Parallel Processing Of Unprotected Postscript Jobs", U.S. Pat. No. 7,161,705 to Klassen et al.

"Parallel RIP With Preamble Caching", U.S. Publication No. 2009/0161163, to Klassen et al.

"Page Parallel Rip And Cache Tuning For Page Description Languages", U.S. Publication No. 2009/0225369, to Gordon et al.

"Parallel Printing System", U.S. Publication No. 2004/0196496, to Klassen.

"Parallel Printing System Having Flow Control In A Virtual Disk Transfer System", U.S. Publication No. 2004/0196497, to Klassen et al.

BRIEF SUMMARY

What is disclosed is a novel fault tolerant page parallel RIP system having a plurality of distributed RIP nodes and a method for robust recovery in the event of a fault having occurred on the system.

In one example embodiment, the present method for robust recovery of a page parallel RIP system proceeds as follows. A page parallel RIP system comprising at least a plurality of RIP nodes, and a supervisor and a splitter receives a job file to be processed. The splitter receives a location of the job file and splits the job file into at least one original chunk. Information sufficient to regenerate the original chunk in the event of a fault condition having occurred on the page parallel RIP system is stored. In one embodiment, information stored about the original chunk is a list of resources required by the original chunk, the list of resources comprising any of: a PostScript preamble, at least one file offset, and an identity of the destination node wherein the original chunk is sent for RIP'ing. The splitter then sends the original chunk to a destination RIP node wherein the original chunk is RIP'ed into at least one page in print-ready form. The one page is then provided in print-ready form to an output subsystem. The stored information about the original chunk can be deleted after all pages of the original chunk have been transferred to the output subsystem. In response to a fault condition having occurred on the page parallel RIP system wherein at least one unresponsive RIP node is determined to be no longer online and active, at least one active RIP node which is still online and active in the RIP system is selected. The identity of the active RIP node where the regenerated chunk is to be RIP'ed into a print-ready form is provided to the splitter. The splitter receives a list of pending chunks on the unresponsive RIP node and regenerates the pending chunks based upon stored information about the pending chunk. The splitter then sends the regenerated chunk(s) to the selected active RIP node for RIP'ing into a print-ready form. The active RIP node RIP's the regenerated chunk into at least one page in print-ready form. Once the regenerated chunk is in print-ready form, the at least one print-ready page from the regenerated chunk is transferred to an output subsystem. Various embodiments have been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
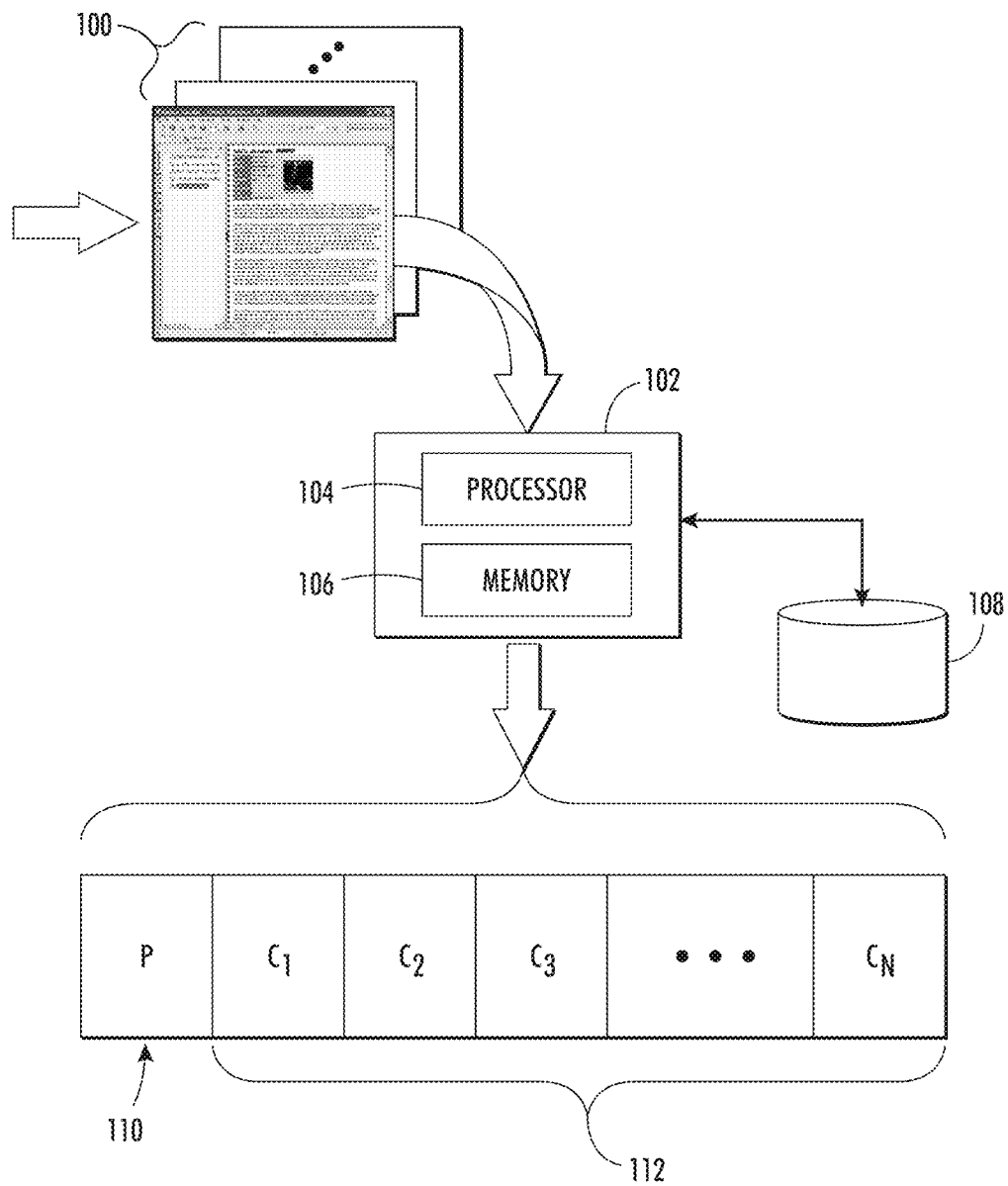
FIG. 1 illustrates an example print job comprising pages of an example print job having been split into a preamble and a plurality of chunks for rasterizing by assigned destination RIP node.

What is disclosed is a novel fault tolerant page parallel RIP system having a plurality of distributed RIP nodes and a method for robust recovery in the event of a fault having occurred on the system. Page parallel RIP (PPR) jobs are consumed by a splitter which identifies independently processable chunks and distributes them to individual RIPs. In the DocuSP form of PPR a supervisor process provides chunk destinations to the splitter and monitors progress of the pages. A collector tracks the pages and chunks in flight and serializes page complete messages to be transmitted to the output subsystem. When a RIP crashes (for whatever reason), the entire system faults. While the present invention will be described with reference to the elements of the DocuSP system, it will be understood by anyone skilled in the art that the various processes such as the supervisor, collector and splitter may be implemented in more or fewer processes, with single or multiple threads within each process.

It should be understood that one of ordinary skill in this art would be readily familiar with many facets of document processing including RIP'ing, page parallel processing, and print systems and device settings common to a digital document reproduction environment. Such environments may encompass a variety of document reproduction devices including digital copiers, bookmaking machines, facsimile devices, xerographic or other multi-function document reproduction devices. Such devices generally include a user interface such as a CRT or touch screen display and generally further include any number of data entry interfaces such as a keyboard, mouse, keypad, and the like. Such systems have complex paper transport mechanism, collators, sorters, staplers, to name a few, each controlled by device specific controllers many of which are configurable to one or more device specific settings. Multi-function document reproduction devices generally further include a plurality of paper trays for retaining a variety of print media/stock. One of ordinary skill would also be knowledgeable about computer science, databases, and software and programming systems and methods sufficient to implement the functionality and capabilities described herein in their own system environments without undue experimentation.

Non-Limiting Definitions

A "job", as used herein, refers to a logical unit of work that is to be completed for a customer in a print/copy environment. A job is split into a set of chunks which, combined, form the entire document. Job parallel processing sends separate jobs to separate systems for processing without splitting the job into separate chunks. One example print job is shown and discussed with respect to FIG. 1.

A "Page Description Language" (PDL) is a language which describes the appearance of a printed page. There are various page description languages. For example, Document Structuring Convention conformant PostScript (DSC-PS) is a format which has all of its common content, i.e., information needed for all pages, located at the start of the file. Information specific to each individual page is stored in sequence thereafter. Adobe's Portable Document Format (PDF) stores common content in the form of a file containing multiple objects along with a cross reference table indicating the locations of the objects. Other PDLs contain readily identifiable common content and page-unique content in various formats used for variable data printing, such as VIPP. Document Structuring Conventions (DSC) conformant PostScript® is one system making page independent processing available, however, there are exceptions in this convention so that page independence is not always guaranteed.

A "Raster Image Processor" (RIP) generates bitmap images from a PDL stream. RIP nodes convert files into a print-ready form acceptable by an output subsystem.

A "Page Parallel Rip" (PPR) is a RIP that processes subsets of pages or chunks from a PDL stream simultaneously.

Figure 2:
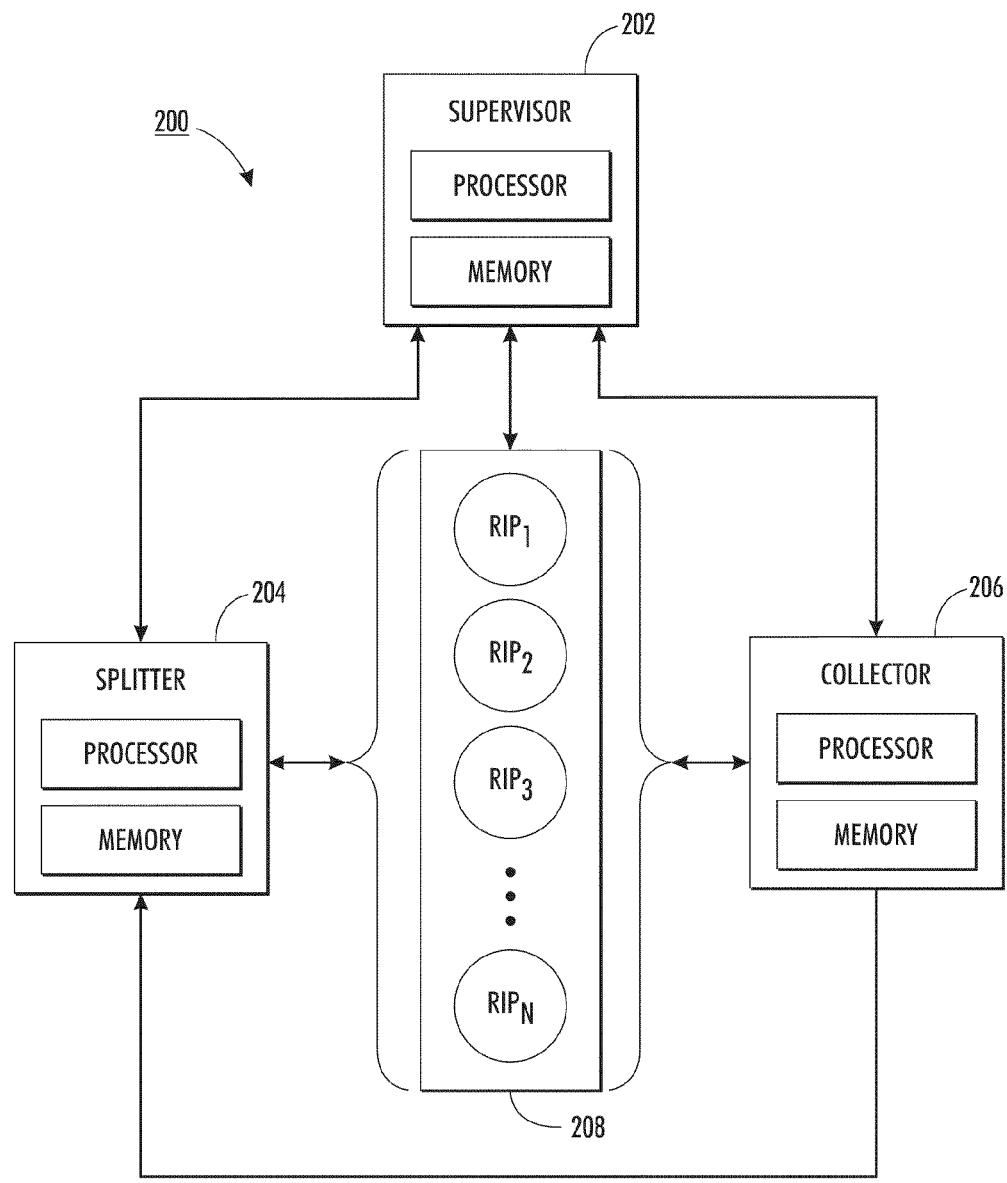
FIG. 2 illustrates a block diagram of an example page parallel RIP system.

A "splitter" is a PPR component that divides a PDL file into one or more chunks which are converted to a print-ready form on multiple independent processors. A splitter divides the job into independent pages or groups of pages: each group when printed must print correctly despite having been removed from the environment of the job in which it originated. Print-ready page(s) are sent to a common print device. Any splitter that can split a document into individual pages can typically concatenate several pages rather than using only one page per chunk, assuming it accepts an input format that supports multiple pages. In a Portable Document Format (PDF) based page parallel RIP system, the job is provided as or converted to PDF and the splitter splits the PDF file into pages which are, in turn, converted to a print-ready form. An example plurality of splitter and destination RIP nodes are shown in FIG. 2.

A "supervisor node" or "supervisor" is a process in a page parallel RIP system that is aware of all of the parallel RIP processes available in the system and assigns chunks of the job to available RIP nodes. The supervisor maintains a model of the time it takes to complete a chunk based upon past experience with each of the RIP nodes and various chunk characteristics determined by the splitter and passed back to the supervisor. The supervisor assigns chunks to the various RIPS by sending messages to the splitter informing it of the chunk destinations, and the splitter then writes the chunks of the file directly to the destination RIPs' file systems and/or memory. In order to keep the RIPs from needing to wait, the supervisor generally assigns chunks before the RIPs are idle, allowing each of them to accumulate a small (typically 1 to 3 chunk) queue of unstarted work. To keep the splitter from needing to wait, the supervisor allows the splitter to accumulate a small queue of unstarted work as well. The queues are kept short so as to keep the estimates of time to completion from being too far off.

A "chunk" of print job data is intended to comprise a collection of rasterizable data consisting of at least one page and not more than one job. Example chunks are shown and discussed with respect to FIG. 1. A chunk may be an integer number of pages less than an entire job but has a startup overhead occurring on a chunk basis as opposed to a per page basis. An individual job is taken from the queue and broken down into pages or other divisible chunks with the chunks being sent to multiple RIPs to be converted in parallel so that individual pages or chunks can be output in logical page order (e.g., chunk 1,2,3). Chunk parallelism is an intermediate level of parallelism between job parallelism and page parallelism. Job parallelism would occur when a job is smaller than the minimum chunk size. Page parallelism occurs when the minimum chunk size is 0 (bytes/pages). A more detailed description of "chunk" parallelism can be found in the above-incorporated U.S. patents and publications which describe chunk parallelism as an intermediate level of parallelism between job parallelism and page parallelism.

A "page (or chunk) parallel RIP system", as used herein, refers to a document processing environment to which the present system and method will likely find their intended uses. A distributed page parallel RIP system contains a plurality of nodes arrayed in a distributed environment such as a network.

An "output subsystem" or 'subsystem' is capable of receiving a RIP'ed page containing, for example, text, graphics, images, and the like, and marking it onto a media substrate such as paper. Subsystems include print engines typically found in multi-function document reproduction devices and may further receive commands and/or system settings used by the print engine to optimize performance. Such commands may include properties or attributes of a desired media type such as, for example, color, weight, thickness, finishing options, and the like.

A "storage device" refers to any device or system capable of storing information sufficient to regenerate a pending chunk in accordance with the embodiments described herein further. Example storage devices include RAM, ROM, Cache Memory, CD-ROM, DVD, flash drives, hard drives, and other volatile or non-volatile storage media. Another storage device is a database, as are well known in the arts, placed in communication with a computer system, workstation, and/or server, that is either remote from or collocated with a device hosting a computing process that accesses and/or stores chunk regeneration information.

Various aspects of the present fault tolerant page parallel RIP system and the method of robust recovery as provided herein may be practiced in a networked computer platform comprising, for example, a computer system or workstation known in the arts capable of communicating with other systems and multifunction devices over a network. Such systems include a desktop computer, laptop computer, mainframe, a motherboard, a special purpose computer, or other dedicated hardware. Such platforms generally incorporate at least one processor, memory, storage, network interface, and other software and hardware resources. Such a computer platform is also capable of executing machine readable program instructions which, when loaded onto the computer platform and executed, cause the platform to perform one or more aspects of the methods provided herein. Any portion of a computer platform may be integrated, in whole or in part, with one or more multifunction document reproduction devices.

The terms "document production" and "document reproduction" are used interchangeably to mean the production of new documents such as, for example, printing a book or magazine, and the reproduction of existing documents.

Reference is now being made to FIG. 1 which illustrates an example print job comprising pages of an example print job having been split into a preamble and a plurality of chunks for rasterizing by assigned destination RIP node.

In the embodiment of FIG. 1, splitter 102 is shown as a node in a distributed page parallel RIP system including processor 104 and memory 106. The splitter is in communication with a storage device 108. The splitter node receives a location in memory or storage of the job file to be RIP'ed. The splitter retrieves the print job and, using techniques well established in this art, splits the job file into a plurality of chunks 112 containing one or more pages and a preamble 110. Chunks may be tailored to the individual destination RIP nodes to which they are sent based upon knowledge of which information has previously been sent to the destination RIP. Individual chunks of a print job are provided to one or more destination RIP nodes wherein the pages are RIP'ed into a print-ready form. The splitter stores information about each page (or chunk) in storage device 108. The information stored is sufficient to regenerate the page in the event of a fault condition having occurred in the system.

The preamble encompasses content common amongst the pages. Normally this information is static for the course of an entire job. In some cases, objects that might be needed later in the job are discovered in pages that are processed subsequent to the first page. Such information is then appended to the preamble which is then pre-pended to subsequent chunks of a job file. In one embodiment a chunk and a preamble address is sent to the RIP nodes so that the RIP can locate the preamble for that particular chunk without having to receive and process the preamble itself. Some PDLs such as, for example, Document Structuring Convention conformant PostScript (DSC-PS) retains all common content at the start of the file. Adobe PostScript® defines a preamble as a segment of PDL code that contains macro definitions, resources, fonts, and the like that PDL code for individual pages of the job might reference or otherwise use. In the case of PostScript preambles, the splitter maintains a preamble that contains all of the information needed in common over multiple pages of a print job or job file. As part of a page parallel RIP system, the preamble needs to be recognized and pre-pended to each chunk sent to each RIP to enable the individual RIP processes to successfully interpret each page in that chunk. Other parallel systems, such as that described in US 20090161163, efficiently process jobs with large preambles by enabling a splitter to do some book-keeping so as to send the preamble for a given job to each PostScript interpreter process exactly once.

For purposes hereof, the PDLs discussed can be generalized into plural 'image formats', including not only PDLs but also other image and information formats such as, but not limited to, PDF, HP-PCL, and facsimile formats.

It should be appreciated that the trade-off between small chunks that offer reduced job time, and large chunks that offer improved throughput, can be managed as a function of job priority.

Reference is now being made to FIG. 2, which illustrates a block diagram of an example page parallel RIP system wherein a splitter sends chunks to various destination RIP nodes for processing. The example RIP system 200 is shown comprising a supervisor node 202 having a processor and memory. The supervisor is in communication with a splitter node 204, a collector node 206, and a plurality of destination RIP nodes 208. The splitter 204 directs chunks, as shown in FIG. 1, to various destination RIP nodes as assigned by the supervisor. Each of the RIP nodes 208 can communicate with some or all of the other RIP nodes along with the collector 206 and the supervisor 202. As is discussed herein further in greater detail with respect to the control flow and architecture of FIG. 6, when a new print job is received, the splitter splits the print job into its preamble and at least one chunk.

In a manner more fully described herein further, when a job arrives in the system the supervisor is informed. The supervisor informs the collector that a new job has arrived. The collector creates a data structure for tracking progress of that job. The supervisor informs a splitter of the location of the new job. The splitter divides the job into chunks containing one or more pages each. When a splitter constructs a chunk, the chunk data structure is written to temporary storage, which may be disk or disk-backed memory. The supervisor supplies the splitter with chunk destinations, which correspond to RIPs on the RIP nodes. The chunk, with all of its dependencies, is written to the destination RIP node. As the splitter sends each chunk to its destination RIP, it sends a message to the supervisor, indicating that a chunk has been transmitted to the RIP, and the supervisor informs the collector. When the RIP completes a page in a chunk, the supervisor is notified. The supervisor notifies the collector. The collector notes that the page is complete, and if no earlier-numbered page is still pending, informs the supervisor, who informs the output subsystem. When a page is completed by a RIP, the page completion is reported to the collector. The collector stores a record of which pages have been completed, and by which RIP, and which ones have been reported complete. When a chunk is completed, the collector informs the splitter that the chunk is now complete, and provides a list of page numbers associated with the page. The list of page numbers is needed since the splitter only splits chunks on what it knows are page boundaries, but it may miss some page boundaries. Thus the splitter is sometimes wrong about page numbers associated with pages. When the splitter receives a chunk complete message from the collector, it stores the list of pending page numbers with the chunk. When pages are transferred off a RIP node, a message is sent to the splitter (directly or via an intermediate process, such as the supervisor). The message may indicate that one page has been completed (transferred to the printer, stored to a separate file system, or printed), or that all pages in a list of pages have been completed (to reduce the number of messages passed in the system, multiple pages may be reported in one message). The splitter then deletes the completed pages from the corresponding list or lists of pending page numbers stored with the chunks. When the last pending page number for a chunk is deleted, the splitter deletes that chunk from its list of pending chunks, and its memory (and potentially disk space) is freed. This system is discussed herein further with respect to the embodiment of FIG. 6.

Figure 3:
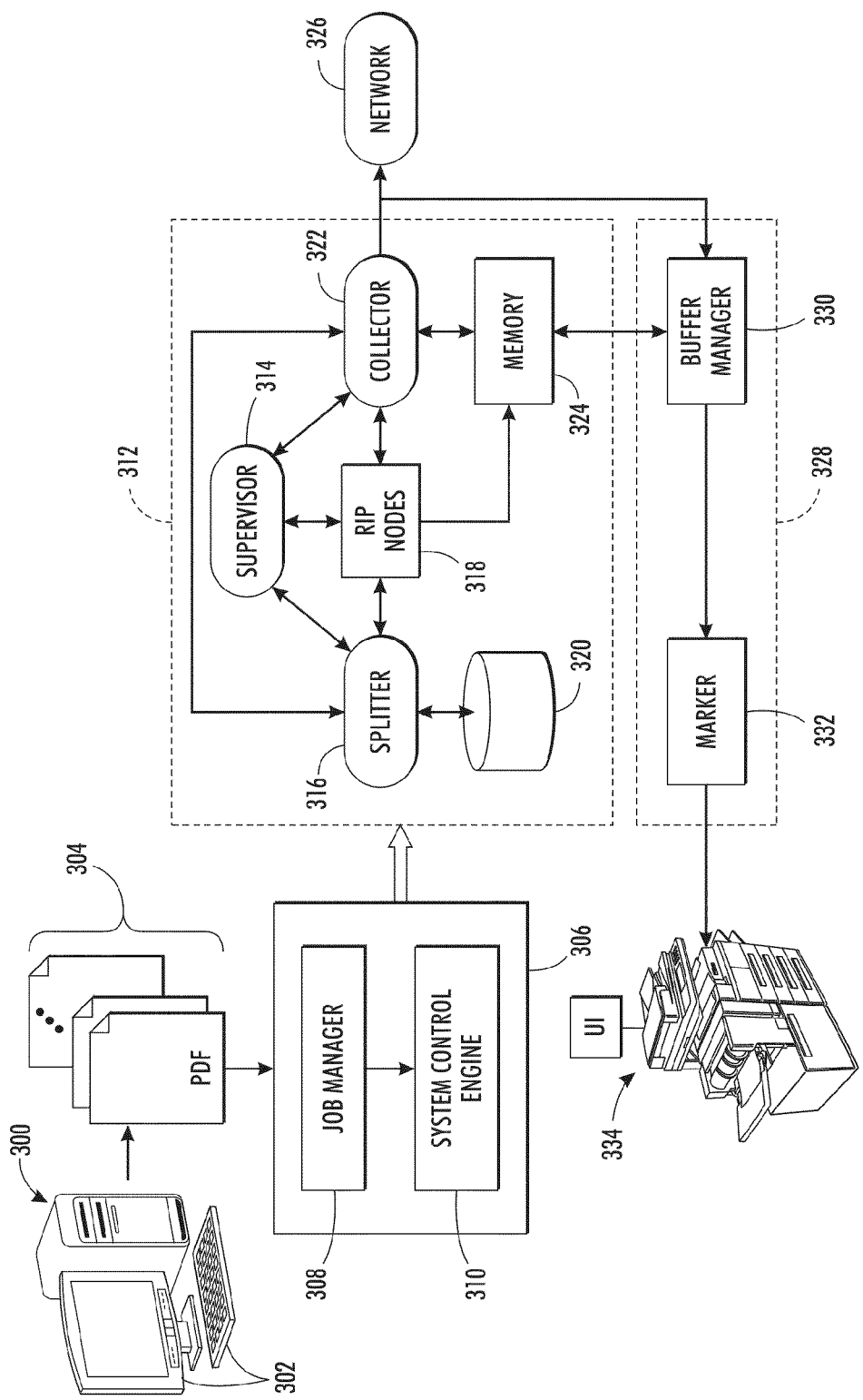
FIG. 3 illustrates a block diagram of an example printing system wherein various aspects of the present method for robust recovery of a page parallel RIP system are likely to find their intended uses.

Reference is now being made to FIG. 3 which illustrates a block diagram of an example printing system wherein various aspects of the present method for robust recovery of a page parallel RIP system are likely to find their intended uses. Various embodiments of the methods disclosed herein are applicable to a wide variety of commercially-available products and thus, it should be appreciated that the subject matter is not to be limited to the implementation shown.

A user, using client computer workstation 300 having a graphical user interface 302 comprising a keyboard, graphical display device, and a mouse (not shown), is used to submit a print job 304 to the print system. The print job comprising a job file of image data in any of a variety of formats such as, for instance, PDF, is submitted to print server 306. It should be appreciated that there could be any number of computing devices interfacing with print server 306. Print server 306 may include certain elements of the commercially-available DocuSP, for example, or may reside, in whole or in part, within workstation 300. Jobs submitted to the print server 306 from client workstation 300 pass through a gateway (not shown) to a job manager 322 which interfaces the print server to the user's workstation. The job manager accesses one or more memory or storage devices (not shown) some or all of which may reside within workstation 300. The job manager 326 includes software that would, for example, enable the user to select one or more print options for their print job. Such options may include, for example stapling, collating, duplex printing, to name a few. The job manager further interfaces with a system control process 310 which directs each job file to the page parallel RIP system 312. The job manager may further interface with any of the modules of system 312, buffer manager 330 and/or marker 332, depending on the system configuration in order to exercise some control of a given job as the job file is processed and passed onto printing apparatus 334. The job manager may further control various aspects of print apparatus 334, such as staplers, paper selection, output tray, feeders, finishers, and the like.

RIP system 312 is a distributed array of nodes collectively responsible for decomposing (RIP'ing) image data into a print-ready format to be printed on printing apparatus 334. Rip system 312 includes at least one splitter node 316, a supervisor node 314, storage device 320, memory 324, a plurality of RIP nodes, collectively at 318, each capable of RIP'ing an incoming job file into a print-ready form, which is preferably compressed. Such a RIP system would include a language identifier module (not shown) which identifies and/or selects the method by which the job is split into chunks. The system may have a splitter for each page description language supported by the system. The RIP system may be placed in communication with one or more remote devices (not shown) via a network 326 which may comprise a wired or wireless LAN which may in turn be connected to the Internet. Supervisor 314 operates to process a job using intelligent scheduling of the plurality nodes in the system. The supervisor informs the splitter 316 of various chunk parameters such as threshold boundaries of a chunk (maximum page count, maximum byte count), and the like.

Splitter 316 directs the image data from an incoming job ultimately submitted from client workstation 300 and distributes that job to the various destination RIP nodes 318 which, in turn, interface with memory 324, which stores split chunks and print-ready pages. The splitter breaks the incoming job file into a plurality of chunks based upon page boundaries, possibly containing more than one page per chunk and stores information sufficient to regenerate a given chunk on storage device 320 or in memory 324. Such information may include a list of resources required by the chunk including some or all of the content of the preamble, and a file offset. Such information may also include an identity of a destination RIP node in the page parallel RIP system or RIP node addresses to which chunks of each job being RIP'ed have been sent. In one embodiment, a data structure corresponding to each chunk is retained in storage by the splitter. The data structure contains all information required to regenerate the chunk. The data structure may further include any RIP-specific tailoring yet to be applied. The data structure is retained until the chunk is completely RIP'ed and is in print-ready form. Oldest data structures written to disk are preferably erased first. In the event of a crash involving one or more RIP nodes, the splitter re-tailors the chunks to their new destination RIP nodes, and re-sends them. For PostScript, the data structure may comprise a collection of preamble portions beginning with the original preamble and then including each of the segments of additional information stored separately and associated with the version number on which that segment first appears. For IPDS, the data structure may additionally comprise page content and a list of dependencies which may take the form of resource identifiers. Each resource may have dependencies as well, which are indirectly indicated by the dependency list. The splitter maintains a set of resource identifiers for each node. All resources in the dependency list not present in the set correspond to resources that need to be transmitted to the node before the page data. For PDF, the data structure may also comprise a list of page numbers.

RIP nodes 318 operate in parallel to convert the data for the multi-page document into print-ready subsets, each corresponding to a chunk. RIP nodes 318 further compress the print-ready pages to reduce downstream bandwidth requirements. For example, in certain implementations, such compression may employ compression according to a multi-mode compression scheme. Although chunks are processed in parallel to completion according to a re-ordered sequence, they are reported as being finished in order. Any of the nodes of the RIP system 312 may be multithreaded so a single node can receive incoming messages about current or pending jobs while still processing previous jobs.

Collector 322 reorders chunk completion messages so that chunks appear to be completed in the same order they appeared in the original job file. The collector is in communication with the splitter 326 to receive information and other statistics gathered by the splitter while the splitting process for a given job is carried out. Depending on the design and configuration of the RIP system, such statistics and other information may be communicated and used by any node in the system to effectuate a load balancing across the system. The collector 322 also maintains a set of jobs in the system and, for each job, a list of chunks in order of arrival. This information is provided to the collector by the supervisor but may be received from one of the other nodes in the system. The collector also preferably maintains a collection of RIP node addresses to which chunks of each job being RIP'ed have been sent. When a job completes, the collector triggers the removal of information stored about a given chunk used herein to effectuate a robust recovery as described herein further with respect to the flow diagrams of FIGS. 4 and 5.

Output subsystem 328 is shown comprising a buffer manager 330 and marker 18. The buffer manager 330 interacts with collector 322 and receives processed image data and temporarily stores the processed job in memory 324 until marker 18 is ready. Such a memory is employed to temporarily retain decomposed pages until such time as the data for the particular page image is required by marker 330 for immediate submission to printing apparatus 334. Marker 332 is intended to represent software, which is directly operative of the print apparatus 334, which provides hardcopy output images.

Figure 4:
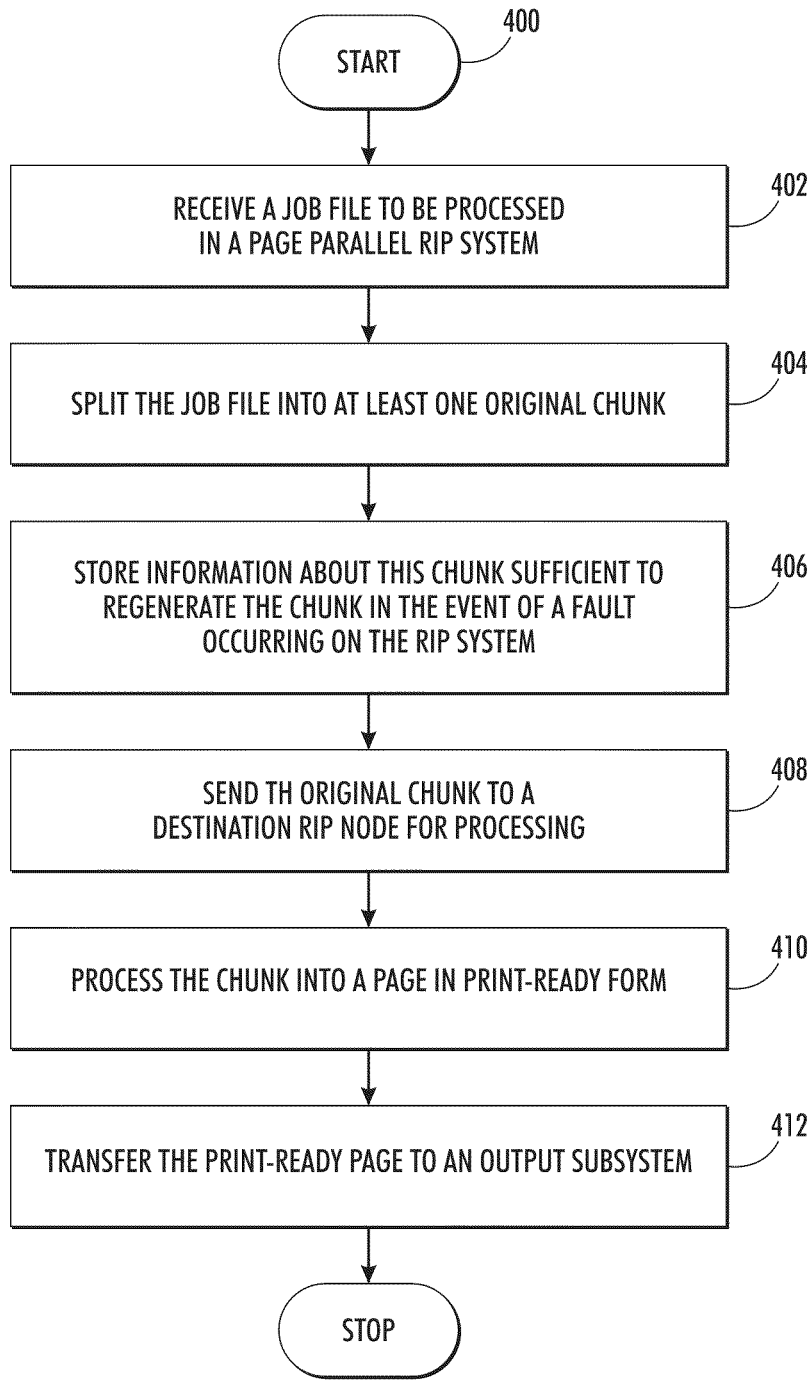
FIG. 4 is a flow diagram of one example embodiment of the present method for robust recovery in a page parallel RIP system comprising a plurality of nodes arrayed in a distributed environment.

Reference is now being made to the flow diagram of FIG. 4 which illustrates one example embodiment of the present method for robust recovery in a page parallel RIP system comprising a plurality of nodes arrayed in a distributed environment. A fault condition having occurred on the page parallel RIP system is discussed with respect to the flow diagram of FIG. 5. Flow processing starts at 400 and immediately proceeds to step 402.

At step 402, a job file to be processed in the page parallel RIP system is received. In one embodiment, a job file comprising image data to be printed is submitted via client 300 of FIG. 3, which could be any of a large number of computers on a network. In the system of FIG. 3, as further described with respect to the block diagram of FIG. 6, a supervisor receives information about the job and passed that job to the splitter.

At step 404, the job file is split by the splitter into at least one original chunk. One example splitter is shown in FIGS. 2 and 3 and discussed herein further with respect to the block diagram of FIG. 6. An example job file having been split into a preamble and plurality of chunks is shown in FIG. 1.

At step 406, the system stores information about the original chunk sufficient to regenerate the original chunk in the event of a fault condition on the page parallel RIP system. In one embodiment, information is stored by the splitter using, for example, storage disk 320 of FIG. 3. Such information stored about the original chunk can be, for example, a list of resources required by the original chunk. Such a list could be a PostScript preamble or at least one file offset. In another embodiment, information stored about the original chunk comprises an identity of a destination RIP node wherein the original chunk is sent for RIP'ing. Other information about the original chunk which is sufficient to regenerate the original chunk in the event of a fault condition having occurred on the page parallel RIP system are intended to fall within the scope of the appended claims.

At step 408, the original chunk is sent to at least one destination RIP node. The splitter directs the image data from an incoming job to various destination RIP nodes. Preambles and other information required by the destination RIP node for a given chunk is also provided.

At step 410, the original chunk is RIP'ed into at least one page in print-ready form. Destination RIP nodes operate in parallel to convert the data for the multi-page document into component subsets of print-ready data, each subset of data corresponding to one chunk to be printed. In one embodiment, the collector reorders chunk completion messages so that chunks appear to be completed in the same order they appeared in the original jobs.

At step 412, a print-ready page is transferred to an output subsystem. The output subsystem may encompass a buffer manager, memory, and a marker, as shown and discussed herein with respect to FIGS. 3 and 6. Thereafter, information stored about the original chunk can be deleted since the chunk is complete. Such information can be deleted by the collector at the time the chunk is completed, or by the splitter or supervisor.

Figure 5:
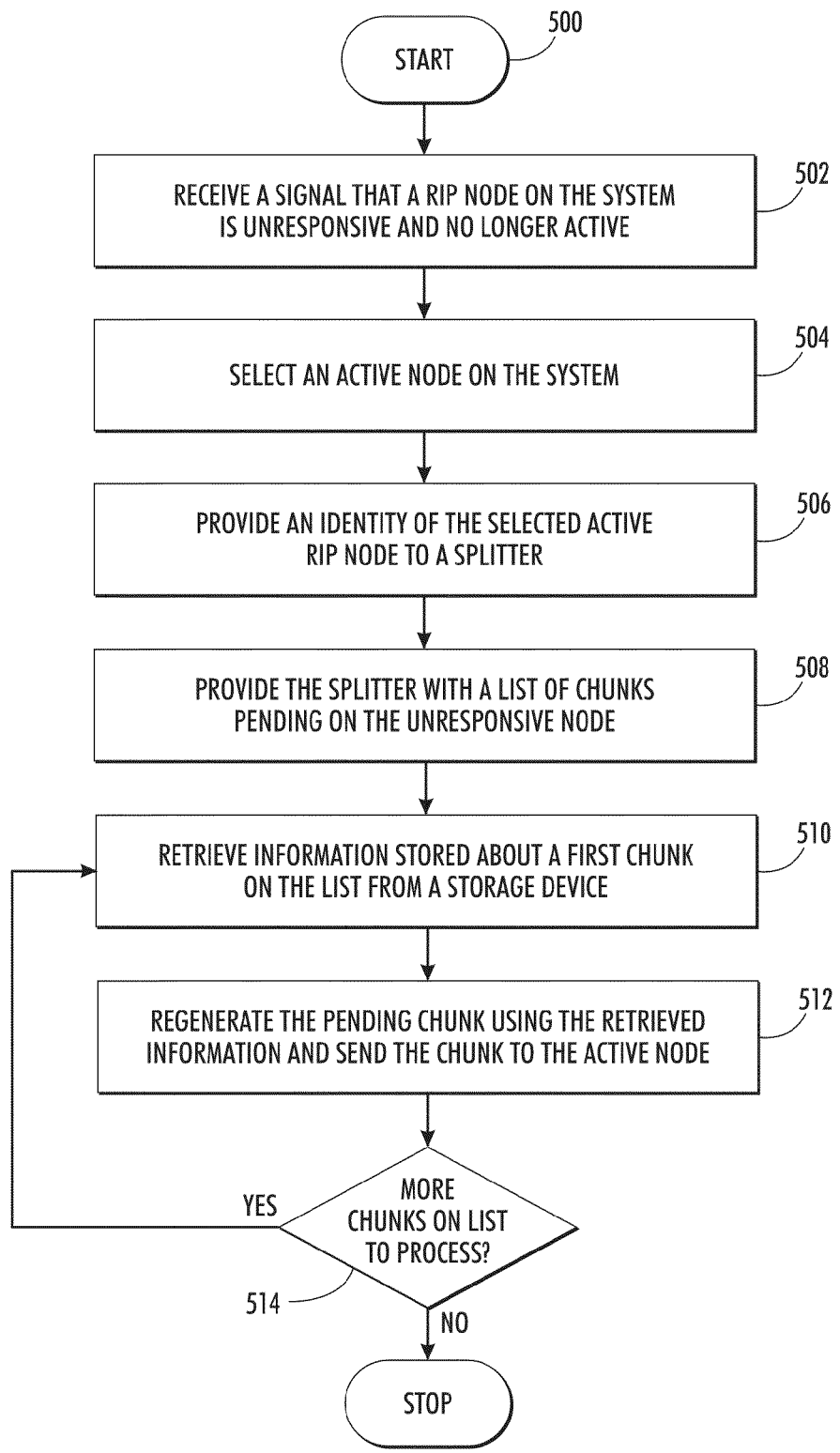
FIG. 5 is a flow diagram of one example embodiment of a computer implemented method for recovering from a fault condition having occurred in a page parallel RIP system having a plurality of nodes arrayed in a distributed environment.

Reference is now being made to the flow diagram of FIG. 5 which illustrates one example embodiment of a computer implemented method for recovering from a fault condition having occurred in a page parallel RIP system having a plurality of nodes arrayed in a distributed environment. Flow processing starts at 500 and immediately proceeds to step 502. The following flow is in response to a fault condition having occurred, i.e., one of the nodes on the page parallel RIP system has gone offline or is otherwise no longer active and unresponsive.

At step 502, the system receives a signal that a RIP node on the RIP system is no longer online and active. This can be a result of, for example, the supervisor having received a system signal that a node has failed or in response to a node having failed to respond to a request by the supervisor or a separate process or thread in a pre-determined amount of time.

At step 504, at least one active RIP node which is still online and active in the page parallel RIP system is selected. In one embodiment, the active RIP node is selected from a plurality of active RIP nodes by a supervisor. Selection can take place by a variety of processes known in the arts such as, for instance, a round-robin selection. Normally, selection will follow the same process that is otherwise used by the supervisor for selecting nodes to receive chunks.

At step 506, the supervisor provides the identify of the selected active RIP node to a splitter. This may be in the form of providing chunk destinations, in the same way as would be done had no node failed, except that the failed node is not included in the candidates to receive a chunk.

At step 508, the supervisor provides the splitter with a list of chunks pending on the unresponsive RIP node.

At step 510, the splitter or an alternative process retrieves the information stored about a first chunk on the list from the storage device. Such a list could be a PostScript preamble or at least one file offset, and/or an identity of a destination RIP node wherein the original chunk is sent for RIP'ing.

At step 512, the splitter regenerates the pending chunk using information about this chunk retrieved from storage and sends the regenerated chunk to the active RIP node. The active RIP node RIPs the regenerated chunk into at least one page in print ready form. The print-ready page is then transferred to an output subsystem. Once the active RIP node has transferred the print-ready page to the output subsystem, information stored about the regenerated chunk can be deleted.

At step 514, a determination is made whether any more pending chunks on the list of pending chunks on the unresponsive RIP node remain to be regenerated. If so, then processing returns to step 510 wherein information store about a next chunk on the list of pending chunks is retrieved from storage. This chunk is then regenerated (at 512) and sent to an active RIP node wherein the regenerated chunk is RIP'ed into at least one page in print ready form. The regenerated chunks may be all sent to the same active node, or they may be sent to a plurality of active nodes. The print-ready page is then transferred to an output subsystem. The stored information about this chunk is deleted once the output subsystem has received all print-ready pages for this chunk. Processing repeats in an iterative fashion until no more pending chunks on the list of chunks known to be pending on the unresponsive node remain to be processed. Thereafter processing continues with any additional chunks required to complete the job, in the normal fashion.

It should be appreciated that not all chunks from the unresponsive node need be transferred to the same RIP. For instance, in a page parallel RIP system having, for example three RIPs on a node and five nodes, with a queue of two chunks per RIP, and having six chunks needing re-dispositioning when one node (containing three RIPs) fails, it is preferable to send one of these chunks to a first RIP on each of the remaining nodes and send the remaining two chunks to a second RIP on two of the remaining nodes.

Figure 6:
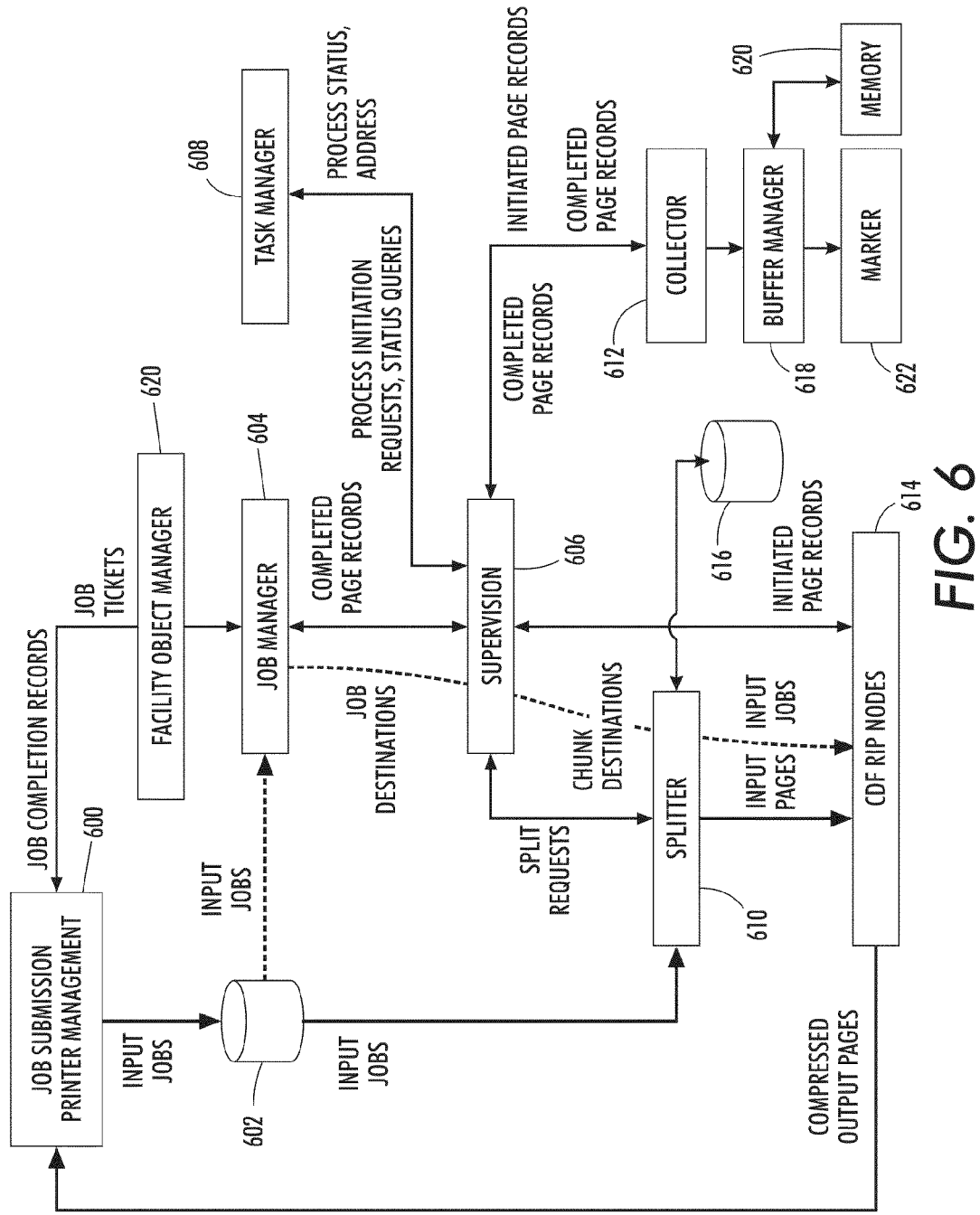
FIG. 6 illustrates a system architecture, control, and data flow of the processing of the present method.

Reference is next being made to FIG. 6 which illustrates a system architecture, control, and data flow of the processing of the present method.

When a job file arrives from a client at job submission/printer management node 600, an input spooling system 602 saves the content either in memory or on disk 602, and the language is determined. Languages include, for example, PostScript, PDF, PPML, unstructured ASCII text, and others as needed. The input spooling system notifies a processing manager for effecting the necessary supervisory functions by indicating the language to job manager 604. The job size, providing the job has been fully received, and how/where to find the data is also determined. Any of several well-known mechanisms may be used to communicate the location of the data, including a network filename for a distributed system, or a memory address for a centralized system. The supervisor 606 uses the determined language to select a splitter(s) 610 capable of splitting this incoming job file. In a large page parallel RIP system, the supervisor selects a splitter based on the estimated amount of pending work on each splitter's queue. The supervisor also notifies the collector 612 that a new job exists in the system. The supervisor then informs the splitter 610 where to find the data. The splitter may begin splitting the file as soon as it is ready. The splitter requests chunk destinations. The supervisor assigns chunks to various destination RIP nodes implementing what is referred to as a Common Decomposer Facility (CDF) 614 using estimates of the amount of work pending on the nodes.

The splitter 610 splits the job into chunks. At each page boundary, the splitter checks to see whether the page count or byte count has been exceeded, and if either one has, it finishes that chunk. As it splits a job into chunks, the splitter sends the chunk to the assigned destination RIP node it received from the supervisor. The splitter writes the chunk into either memory or the disk associated with the node that the destination assigned by the supervisor. According to embodiments hereof, the splitter writes out information about the chunk to storage device 616. The information is sufficient to regenerate the chunk in the event of a fault condition having occurred on the page parallel RIP system. When the splitter writes the first page of a chunk, it notifies the supervisor node which, in turn, notifies a RIP node, and notifies the collector. The collector maintains a set of jobs in the system, and for each job, a list of chunks in order of arrival. In a page (or chunk) parallel RIP system, a document print job often comprises a preamble containing content used in one or more subsequent pages and a body containing content specific to individual pages. Depending on the language, the content common to multiple pages might be at the start of the document, or it might, in the case of PDF, be stored at a number of readily located places throughout the document. The document print job is divided into its preamble and at least one chunk, a chunk containing page-specific content, which is transmitted to one or more RIP nodes. In a parallel RIP system processing PostScript, the jobs are split into chunks by the splitter. Multiple PostScript interpreter processes running on the system independently RIP the chunks and return rasterized images to be printed for the pages within each chunk. Each chunk produced by the splitter contains a replicate of the PostScript preamble, in normally the first portion of the job file, followed by the portion of the job file corresponding to the relevant pages for the chunk.

The supervisor informs the collector of which pages to associate with a given chunk. After the splitter has written several chunks, multiple RIP nodes operate in parallel, writing pages of print ready data. Preferably this data is written in compressed form, such as mixed raster content files, to internal memory data buffers. As a RIP node completes a chunk, it sends a message to the supervisor, which passes the message on to the collector. The collector notes that this chunk is complete, and as long as it finds the first in the list for this job is complete, it removes the first in the list, and informs the supervisor. The supervisor notifies the output spooling system of the location of the output data for that chunk. When the splitter completes a job, it informs the supervisor, which informs the collector to expect no more new chunks for that job.

When the collector receives the last message from the supervisor that a RIP node has completed a chunk, it knows it because that job has an associated end-of-job message, and the list of chunks becomes empty when that chunk is removed from the list. The collector then informs the supervisor node. The compressed output pages for the completed output job are provided to a buffer manager 618 which receives processed image data and temporarily stores the processed job in memory 620 until marker 622 is ready to receive them for transmission to a print device (not shown).

At regular intervals, a thread in the supervisor (or a separate process) sends a message to each RIP node to verify that each is still online and active. If that message fails to be delivered, the sending process receives a signal such as, for example, a SIGPIPE in a POSIX system, indicating that the receiving process no longer exists or has otherwise failed to timely respond. When this occurs, all pending work for that node must be re-directed to another RIP. A back end process may discover that the node has gone away when it attempts to pull a page from the node. Robust recovery begins when the supervisor discovers that a RIP node with a non-empty work queue is no longer available. The first step is to inform the back end that the RIP node has gone away. The back end may have discovered this on its own, but if not, this provides synchronization. Once the back end has been informed that the RIP node has gone away, it responds with the page IDs (if any) it has successfully received since it last reported and before the node failed. The splitter receives this message and now has correct and up-to-date information about all pages that were generated and successfully removed from the unresponsive RIP node. The second step is to inform the collector that that the unresponsive RIP node is offline. The collector deletes from its list of pending chunks all chunks for that RIP node. When the splitter receives a message that a RIP node is unresponsive, the splitter removes any chunk destination messages from its chunk destination queue, where the destination is the now-defunct RIP. For some languages (such as PDF), the splitter can be certain to catch all page boundaries. If so, it transmits only the pages of any incomplete chunk(s) to the appropriate RIPs, and sends a message to the collector informing it of the new location of any partial chunk(s). Otherwise, it transmits the entire incomplete chunk(s) to the appropriate RIPs and sends a message to the collector informing it both of the new location of any partial chunk(s) and which pages will be redundantly generated, and hence should not be printed. The splitter can now transmit any remaining (non-partial) chunks, re-tailored and re-targeted for new destination RIPs, in the normal way, and it does so before transmitting any new chunks. If the collector receives a message indicating that some pages are to be suppressed, it causes those pages to be deleted when they are reported complete, and does not report them complete to the back end, but it treats them as if they were completed and reported for the sake of its bookkeeping.

Such a system can be implemented as a distributed system or a centralized service on a single multiprocessor machine. The system may be implemented in a symmetric multiprocessor (SMP) environment or in a distributed multi-processor configuration. All or portions of the flow diagrams, as illustrated and described herein, may be implemented partially or fully in hardware in conjunction with machine executable instructions in communication with various components of a RIP system architecture.

The embodiments described with respect to the flow diagrams of FIGS. 4 and 5 and further shown and discussed with respect to the block diagrams of FIGS. 2 and 6, are not to be viewed as limiting. Rather, it should be understood that some or all of the functionality of any of the Supervisor, Collector, Splitter, and any of the RIP nodes, can be performed by one or more of the other. For example, a Supervisor may perform some or all of the functionality of a Collector, or vice-versa. Moreover, some or all of the functionality performed by any of the Supervisor, Collector, and Splitter can be performed by a process on a single chip such as an ASIC. Such processes may take the form of threads in a multi-threaded environment or one or more processors executing machine readable program instructions for performing their respective roles as described and claimed. Such embodiments are intended to be encompassed by the scope of the appended claims.

It should be appreciated that various modules of the diagrams of FIGS. 2, 3 and 6 designate a system component which may comprise software and/or hardware designed to perform a specific function. A plurality of modules may collectively perform a function. A module may have a specialized processor capable of reading machine executable program instructions. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. A module may comprise a single piece of hardware such as an ASIC, electronic circuit, or special purpose computer system.

Figure 7:
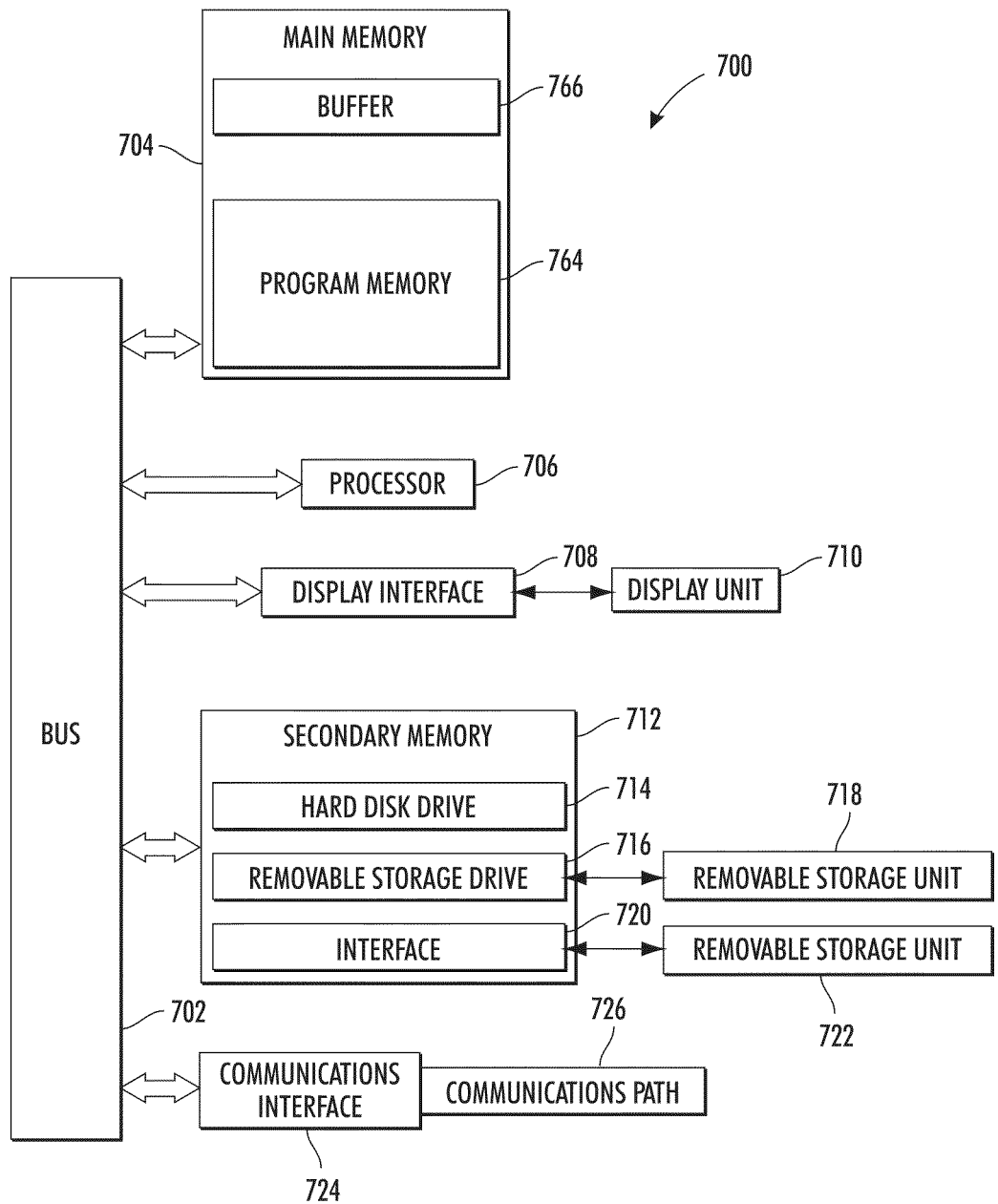
FIG. 7 which illustrates a block diagram of one example embodiment of a special purpose computer system for performing one or more aspects of the present system and method as described with respect to the example flow diagrams of FIGS. 4 and 5 and the example functional block diagrams of FIGS. 2, 3, and 6.

Reference is now being made to FIG. 7 which illustrates a block diagram of one example embodiment of a special purpose computer system for performing one or more aspects of the present system and method as described with respect to the example flow diagrams of FIGS. 4 and 5 and the example functional block diagrams of FIGS. 2, 3 and 6. Such a special purpose processor is capable of executing machine readable program instructions for carrying out one or more aspects of the present method and may comprise any of a micro-processor or micro-controller, ASIC, electronic circuit, or special purpose computer system. Such a system can be integrated, in whole or in part, with a xerographic system, color management system, or image processing system.

Special purpose computer system 700 includes processor 706 for executing machine executable program instructions for carrying out all or some of the present method. The processor is in communication with bus 702. The system includes main memory 704 for storing machine readable instructions. Main memory may comprise random access memory (RAM) to support reprogramming and flexible data storage. Buffer 766 stores data addressable by the processor. Program memory 764 stores machine readable instructions for performing the present method. A display interface 708 forwards data from bus 702 to display 710. Secondary memory 712 includes a hard disk 714 and storage device 716 capable of reading/writing to removable storage unit 718, such as a floppy disk, magnetic tape, optical disk, etc. Secondary memory 712 may further include other mechanisms for allowing programs and/or machine executable instructions to be loaded onto the processor. Such mechanisms may include, for example, a storage unit 722 adapted to exchange data through interface 720 which enables the transfer of software and data. The system includes a communications interface 724 which acts as both an input and an output to allow data to be transferred between the system and external devices (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 726 which carries such signals and may be implemented using wire, cable, fiber optic, phone line, cellular link, RF, memory, or other means known in the arts.

It should be appreciated that although generally depicted as an integral RIP system, each of the modules may be either units and/or capabilities internal to a controller or a device, or individually or in combination, attached as separate processes along a path that facilitates communication between such units by one or more buses. Such buses may be undertaken by, for example, one or more of a wired, a wireless, an optical, or other like connection, either individually or via some form of network communication between individual modules/components and the overall system supporting image formation in an image forming device. Any of the data storage units depicted may be implemented using an appropriate combination of alterable, volatile/non-volatile memory, or fixed memory. Alterable memory, whether volatile or non-volatile, may be implemented using any one or more of static or dynamic RAM, or, for example, any computer-readable type media and compatible media reader, a hard drive, a flash memory, or any other like memory medium and/or device. Similarly, a non-alterable or fixed memory may be implemented using any one or more of ROM, PROM, EPROM, EEPROM, optical or other disk such as, for example, CD-ROM, SDVD-ROM, blue ray or other disk type media and compatible disk drive, or any other like memory storage medium and/or device.

Computations necessary to establish and/or to determine any of the operations shown and discussed herein may be performed on a programmable general purpose computer, special purpose computer, program microprocessor or microcontroller, or other like digital signal processing devices. These other like digital signal processor may include, but are not limited to, peripheral integrated circuit elements, ASIC, or other integrated circuits, hard-wired electronic or logic circuit, such as, for example, discrete element circuits, programmable logic devices such as PLD, PLA, FGPA or PAL or the like, or may even be manipulated through manual adjustment of one or more operating parameters and/or user-adjustable input parameters that may be associated with any of the above-described modules.

It should be appreciated that various of the above-disclosed and other features and functions, or alternatives thereof, may be desirably combined into many other different systems or applications. The above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

The methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications are each separately hereby incorporated by reference in their entirety.

What is claimed is:

1. A method for robust recovery in a page parallel RIP system that includes a splitter node and a plurality of distributed RIP nodes, the method comprising:
    receiving a job file to be processed in a page parallel RIP system;
    informing, by a supervisor node, a splitter node of a location of said job file;
    splitting, by said splitter node, said job file into a plurality of chunks;
    storing, by said splitter node, a chunk data structure for each of said plurality of chunks, each chunk data structure containing information required to regenerate a corresponding chunk in an event of a fault condition on said page parallel RIP system while performing a RIP process by a RIP node on a chunk that corresponds to a chunk data structure stored by said splitter node, said information comprising a list of resources required by said corresponding chunk, said list of resources comprising page content and a list of dependencies comprising a set of resource identifiers, said splitter node maintaining said set of resource identifiers for each RIP node;
    assigning, by said supervisor node, one of said chunks to a first RIP node;
    in response to a signal indicating that said first RIP node is no longer active or is unresponsive, said supervisor node selecting a second RIP node which is still online and active in said page parallel RIP system, said second RIP node being different than said first RIP node, and communicating an identity of said selected second RIP node to said splitter node, said splitter node receiving a list of chunks pending on said first RIP node, said list of chunks pending including said one chunk;
    retrieving, by said splitter node, said chunk data structure corresponding to said one chunk;
    using said retrieved chuck data structure to regenerate said one chunk;

sending said regenerated chunk to said selected second RIP node;

processing, by said second RIP node, said regenerated chunk into at least one print-ready page;

transferring said at least one print-ready page from said second RIP node to an output subsystem; and in response to said output subsystem having received all print-ready pages for this chunk, said splitter node deleting said chunk data structure corresponding to said regenerated chunk.

2. The method of claim 1, further comprising, in response to said at least one print-ready page having been transferred to said output subsystem, suppressing print-ready pages of said regenerated chunk that were previously transferred.

3. A fault tolerant page parallel RIP system having a plurality of distributed nodes, the fault tolerant page parallel RIP system comprising:

a plurality of RIP nodes; and at least one splitter node, performing:

receiving a job file to be processed;

informing, by a supervisor node, a splitter node of a location of said job file;

splitting, by a splitter node, said job file into a plurality of chunks;

storing, by said splitter node, a chunk data structure for each of said plurality of chunks, each chunk data structure containing information required to regenerates a corresponding chunk in an event of a fault condition having occurred on said page parallel RIP system while performing a RIP process by a RIP node on a chunk that corresponds to a chunk data structure stored by said splitter node, said information comprising a list of resources required by said corresponding chunks, said list of resources comprising page content and a list of dependencies comprising a set of resource identifiers, said splitter node maintaining said set of resource identifiers for each RIP node;

assigning, by said supervisor node, one of said chunks to a first RIP node;

after sending said one chunk to said first RIP node and in response to a signal indicating that said first RIP node is no longer active or unresponsive, said supervisor node selecting a second RIP node which is still online and active in said page parallel RIP system, said second RIP node being different than said first RIP node, and communicating an identity of said selected second RIP node to said splitter node, said splitter node receiving a list of chunks pending on said first RIP node, said list of chunks pending including said one chunk;

retrieving, by said splitter node, said chunk data structure corresponding to said one chunk;

using said retrieved chunk data structure to regenerate said one chunk;

sending said regenerated chunk to said second RIP node, wherein said second RIP node RIPs said regenerated chunk into at least one print-ready page, and transferring said at least one print-ready page to an output subsystem; and in response to said output subsystem having received all print-ready pages for this chunk, said splitter node deleting said chunk data structure corresponding to said regenerated chunk.

4. The fault tolerant page parallel RIP system of claim 3, wherein, in response to said at least one print-ready page having been transferred to said output subsystem, further comprising suppressing print-ready pages of said regenerated chunk that were previously transferred.

5. The method of claim 1, wherein said list of resources further includes content of a preamble, a file offset, an identity of at least one destination RIP node in said page parallel RIP system, and RIP node addresses to which chunks of each job being RIP'ed have been sent.

6. The method of claim 1, wherein, in response to said first RIP node no longer being active, said splitter node re-tailoring said chunk to a new destination RIP node, and re-sending said chunk to said new destination RIP node.

7. The fault tolerant page parallel RIP system of claim 3, wherein said list of resources further includes content of a preamble, a file offset, an identity of at least one destination RIP node in said page parallel RIP system, and RIP node addresses to which chunks of each job being RIP'ed have been sent.

8. The fault tolerant page parallel RIP system of claim 3, wherein, in response to said first RIP node no longer being active, said splitter node re-tailoring said chunk to a new destination RIP node, and re-sending said chunk to said new destination RIP node.

* * * * *